W. P. REES.
SPRING BOTTOMS FOR BEDS, &c

No. 184,727. Patented Nov. 28, 1876.

Attest.
William R. Fee
D. P. Kennedy

Inventor.
William P. Rees
by William Hubbell Fisher,
his attorney,

UNITED STATES PATENT OFFICE.

WILLIAM PURSEL REES, OF ELIZABETHTOWN, OHIO.

IMPROVEMENT IN SPRING-BOTTOMS FOR BEDS, &c.

Specification forming part of Letters Patent No. 184,727, dated November 28, 1876; application filed January 29, 1874.

*To all whom it may concern:*

Be it known that I, WILLIAM PURSEL REES, of the town of Elizabethtown, county of Hamilton, and State of Ohio, have invented certain Improvements in Spring-Bottoms, of which the following is a specification:

My invention relates to the employment of two slats, of suitable material, combined together in a new and original manner and by means of original devices, whereby a cheap and efficient spring is obtained. This spring is useful for the bottoms of beds, and for the backs or bottoms of sofas, lounges, and seats of railroad and road vehicles.

Figure 1:
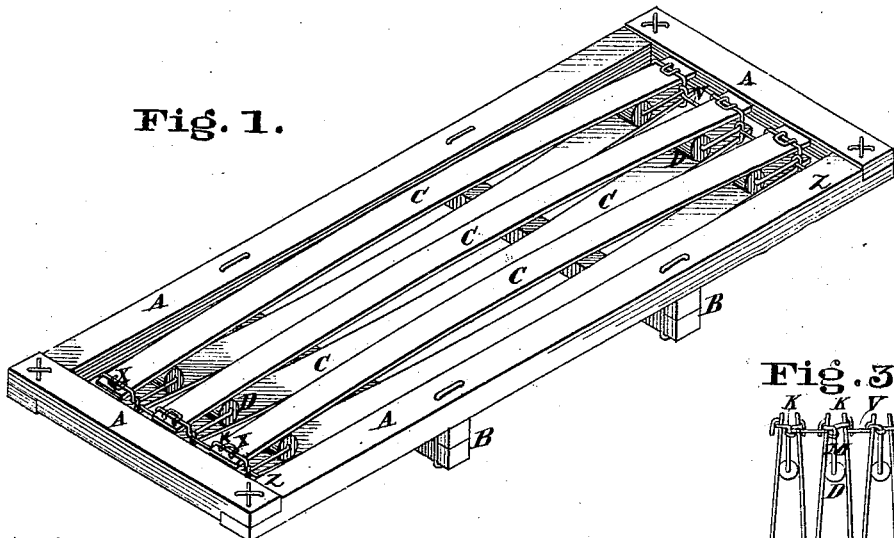
Figure 2:
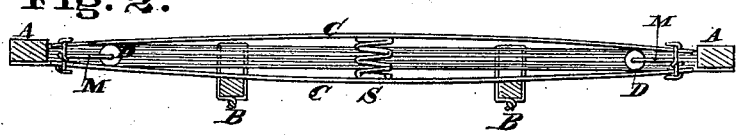
Figure 3:
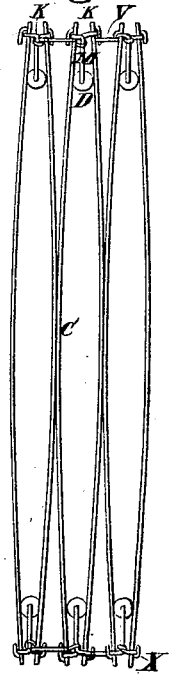

In the accompanying drawing, Figure 1 is a view, in perspective, of a spring-bottom embodying the principle of my improvement, and showing one form of bearing. Fig. 2 is a longitudinal vertical section, taken through the center of the spring-bottom shown in Fig. 1, and also showing a spring inserted between a pair of the slats. Fig. 3 shows three springs of a spring-bottom, such as is shown in Fig. 1, and placed in position for transportation.

A is the frame, in which the spring-bottom may be placed—here introduced to show how the spring-bottom must properly rest upon supports B and be held in position. C are slats or strips of wood or other suitable material. These slats are arranged parallel to each other, and in pairs, as shown in Fig. 1. The two slats of each pair are separated by fulcrum-bearings D, placed between them and near their ends. These bearings are held in position by an arm or fastening of metal or other suitable material. In the spring-bottom, as shown in the drawing, the wire fastening passes through the fulcrum-bearings D, and is continued around the end of the slats, thereby forming the coupling. The latter prevents the separation of the strips. X are catches inserted in the slat on that side of the coupling which is nearest the end of the slat, and, being folded down over the coupling, prevent the latter from slipping off the end of the slat. If preferred, a spring, S, can be placed between the centers of a pair of strips, as shown in Fig. 2; but such spring is not usually necessary. Each pair of strips is connected with the adjacent pair by a link or suitable fastening, V. The latter is so made as to permit the pairs of slats to be folded against each other, top against top or bottom against bottom, as shown in Fig. 3, thus rendering the whole spring-bottom, after being put together, capable of being easily packed and transported.

The couplings of the slats next to the side pieces of the frame of the spring-bottom are preferably attached to the said side pieces by springs or elastic couplings Z, thereby allowing the ends of the slats next the side pieces to yield to superincumbent pressure along with those slats nearer the center of the spring-bottom. The cross-pieces B attached to the frame serve as supports for the slats, and are preferably placed so as to support each pair of slats between its bearings.

It may be here remarked that the preferred width of the space between each adjacent pair of slats is the same as the width of the slats.

When deemed necessary, each slat can be easily taken from its couplings, and all the slats can be thus readily packed in a convenient form for transportation.

The coupling K is capable of being slid along the pair of slats it embraces, and its fulcrum-bearing D goes with it. The power of the slats to resist superincumbent pressure at their centers can therefore be increased by moving the couplings and bearings nearer the centers of the slats. By moving the coupling and bearings out toward the ends of the slats the power of the slats to resist vertical pressure at their centers is diminished, but greater elasticity is imparted to them.

A great and evident advantage resulting from the afore-described improvements is the capability I thus obtain of imparting greater or less elasticity and strength to the spring-bottom without the necessity of additional mechanical appliances, such as springs, rubbers, or the like, to obtain such results.

Among other advantages are also the following, viz.: Each slat may be reversed or replaced. Each pair of slats is reversible by itself. Either side of the spring-bottom, as an entirety, may be uppermost, with equal advantage, and without detriment to the performance of its functions.

What I claim as my invention, and desire to secure by Letters Patent, is—

1. A spring for a seat or bed-bottom, consisting of slats C C, provided at either end with bearings D, link M, coupling K, and catch X.

2. A series of springs for a seat or bed-bottom, consisting of slats C C, provided at either end with bearing D, link M, coupling K, and catch X, said springs being arranged side by side, and coupled together by links, substantially as and for the purpose specified.

3. In combination with a spring composed of slats C C, having at either end bearing D, link M, and coupling K, all disposed as specified, the support or supports B, said supports being placed under the lower slat and between the bearings D of said slats, whereby the full resiliency of the spring is obtained.

W. PURSEL REES.

Witnesses:
D. P. KENNEDY,
J. FRANK BLOOMER.